United States Patent
Chung et al.

(10) Patent No.: US 9,290,844 B2
(45) Date of Patent: Mar. 22, 2016

(54) METHOD FOR PREPARING METALLIC THIN FILM

(75) Inventors: Kwang Choon Chung, Gyeonggi-do (KR); Hyun Nam Cho, Gyeonggi-do (KR); Ji Hoon Yoo, Gyeonggi-do (KR); Jae Ho Beak, Gyeonggi-do (KR); Yoo Seong Kim, Seoul (KR)

(73) Assignee: Inktec Co., Ltd., Kyeongki-do (KR)

( * ) Notice: Subject to any disclaimer, the term of this patent is extended or adjusted under 35 U.S.C. 154(b) by 363 days.

(21) Appl. No.: 13/142,895

(22) PCT Filed: Dec. 29, 2009

(86) PCT No.: PCT/KR2009/007897
§ 371 (c)(1),
(2), (4) Date: Sep. 14, 2011

(87) PCT Pub. No.: WO2010/077067
PCT Pub. Date: Jul. 8, 2010

(65) Prior Publication Data
US 2011/0318481 A1    Dec. 29, 2011

(30) Foreign Application Priority Data
Dec. 31, 2008    (KR) ................ 10-2008-0138036

(51) Int. Cl.
H05K 3/12      (2006.01)
C23C 18/08     (2006.01)
C09D 11/52     (2014.01)
H01B 1/02      (2006.01)

(52) U.S. Cl.
CPC ............ *C23C 18/08* (2013.01); *C09D 11/52* (2013.01); *H01B 1/02* (2013.01)

(58) Field of Classification Search
CPC .......... C09D 11/52; C23C 18/08; H01B 1/02
USPC ........................................... 427/369
See application file for complete search history.

(56) References Cited

U.S. PATENT DOCUMENTS 4,762,560 A      8/1988 Brasch
6,830,778 B1 *  12/2004 Schulz et al. ............. 427/123
(Continued)

FOREIGN PATENT DOCUMENTS

JP    11319538 A    11/1999
JP    200275999 A    3/2002
(Continued)

OTHER PUBLICATIONS

Magdassi, et al., "Silver Nanoparticles as Pigments for Water-Based Ink-Jet Inks", Chem. Mater., Apr. 24, 2003, pp. 2208-2217, vol. 15, No. 11.

Primary Examiner — Dah-Wei D Yuan
Assistant Examiner — Kristen A Dagenais
(74) Attorney, Agent, or Firm — The Webb Law Firm

(57) ABSTRACT

Provided is a method for manufacturing a metal film, including: coating or printing a metal ink containing an organic metal complex on a substrate; and necessarily parallel-performing a pressure process during a procedure of forming metal particles by firing the metal ink, thereby forming a conductive metal film. The present invention can provide a method for manufacturing a metal film capable of improving film characteristics such as conductivity, reflectance, and uniformity in thickness, and the like, as well as remarkably shortening the time for forming the metal film, thereby efficiently manufacturing a superior-quality metal film.

7 Claims, 1 Drawing Sheet

(56) References Cited

U.S. PATENT DOCUMENTS

| | | | |
|---|---|---|---|
| 2005/0081907 A1* | 4/2005 | Lewis et al. | 136/243 |
| 2006/0060885 A1* | 3/2006 | Wu et al. | 257/183 |
| 2007/0096096 A1* | 5/2007 | Kuwabara et al. | 257/59 |
| 2007/0134507 A1* | 6/2007 | Yamasaki et al. | 428/500 |
| 2008/0206488 A1 | 8/2008 | Chung et al. | |
| 2008/0277630 A1* | 11/2008 | Kiyoshima et al. | 252/514 |

FOREIGN PATENT DOCUMENTS

| | | |
|---|---|---|
| JP | 2002329949 A | 11/2002 |
| JP | 2004221006 A | 8/2004 |
| JP | 2004256757 A | 9/2004 |
| JP | 2004273205 A | 9/2004 |
| JP | 200838241 A | 2/2008 |
| JP | 2008531810 A | 8/2008 |
| JP | 20101372 A | 1/2010 |
| JP | 2010500475 A | 1/2010 |
| JP | 2012514304 A | 6/2012 |
| KR | 1020040055197 A | 6/2004 |
| KR | 20050061285 A | 6/2005 |
| KR | 1020060112025 A | 10/2006 |
| KR | 100772798 B1 | 11/2007 |
| WO | WO 2008018718 A1 * | 2/2008 |

* cited by examiner

METHOD FOR PREPARING METALLIC THIN FILM

TECHNICAL FIELD

The present invention relates to a method for manufacturing a metal film, and more particularly to a method for manufacturing a metal film by coating or printing a metal ink containing an organic metal complex on a substrate and then necessarily parallel-performing a pressure process necessarily during a firing procedure.

BACKGROUND ART

A metal film has been recently of increasing interest, because of restriction of the use of lead in electronic part circuits, needs of metal film patterns in low-resistance metal wiring, a printed circuit board (PCB), a flexible printed circuit board (FPC), an antenna for a radio frequency identification (RFID) stag, and electromagnetic shielding, and new fields such as a plasma display panel (PDP), a thin film transistor-liquid crystal display (TFT-LCD), an organic light emitting diode (OLED), a flexible display, an organic thin-film transistor (OTFT), and the like, and usefulness in simply forming electrodes.

According to a general method, a metal film is formed by depositing or sputtering metal or spin-coating ink containing metal to form a metal layer, performing a photo-resist process through exposure and development to form a desired pattern, and then performing etching to manufacture the metal film indirectly. However, the above method requires complex processing and is not suitable for forming multi-layered patterns. Furthermore, the above method has problems in that development of vacuum deposition equipment is limited due to increase in size of substrate and unnecessary materials generated at the time of forming patterns cause environmental pollution.

Recently, in order to overcome these problems, Japanese Patent Laid-Open Publication No. 2004-221006 (2004 Aug. 5) and No. 2004-273205 (2004 Sep. 30) disclose that nanoparticles, powder or flake of metal, a binder resin or a solvent are used to prepare a paste of metal, or Chem Mater, 15, 2208(2003), Japanese Patent Laid-Open Publication No. Hei 11-319538, Japanese Patent Laid-Open Publication No. Hei 2004-256757, and U.S. Pat. No. 4,762,560 disclose that a metal compound such as silver nitrate, hydrogen tetrachloroaurate, or copper sulfate, reacts with other compounds in an aqueous solution or an organic solvent to form colloids or nanoparticles. However, these methods are limited in the use of various kinds of substrates since they bring about high manufacturing costs and decrease in stability and require a complex process and high firing temperature. In addition, Korean Patent No. 2005-0061285 discloses a method for forming a metal pattern by forming a potential pattern on a substrate using a photocatalytic compound and then performing plating using a desirable metal. However, this method has a short activation time of the potential pattern and is inappropriate in continuous processes.

In order to solve the above disadvantages, a heat compressing process is performed after forming metal patterns. For example, Korean Patent No. 2002-0081822 describes a method of firing metal printing patterns through heat treatment and then performing a heat compressing process. However, this method still has a problem in that there is a limit to densify a metal structure in forming of a metal film.

DISCLOSURE

Technical Problem

An object of the present invention is to provide a method for manufacturing a conductive metal film by coating or printing a metal ink containing an organic metal complex on a substrate and then necessarily parallel-performing a pressure process in a specific step during a firing procedure.

Another object of the present invention is to provide a method for forming a metal pattern capable of improving film characteristics such as conductivity, reflectance, and uniformity in thickness, and the like, as well as remarkably shortening the time for forming the metal film by necessarily parallel-performing a pressure process in a specific step during a firing procedure.

Technical Solution

The present invention is to provide a superior-quality metal film manufactured by an efficient process capable of improving characteristics of the thin film and remarkably shortening the time for forming the metal film.

The present invention is to provide a method for manufacturing a metal film capable of improving film characteristics such as conductivity, reflectance, and uniformity in thickness, and the like, as well as remarkably shortening the time for forming the metal film.

Hereinafter, the present invention will be described in more detail.

In one general aspect, a method for manufacturing a metal film of the present invention includes: (a) coating or printing a metal ink containing an organic metal complex on a substrate; and (b) parallel-performing a pressure process during a procedure of forming metal particles by firing the metal ink, thereby forming a conductive metal film.

The coating or printing of a metal ink containing an organic metal complex on a substrate in step (a) performs coating or printing of a metal ink containing an organic metal complex on a substrate. The reason why the metal ink containing an organic metal complex is used is that a pressure process is performed from a step where metal particles for forming the metal film are granulized during a firing procedure. Another reason is that the metal ink containing an organic metal complex has advantages in that it has excellent stability and good solubility in a solvent, which allows the formation of metal pattern, and it is dissolved at relatively low temperatures to facilitate the formation of metal patterns.

The kinds of organic metal complexes are not particularly limited, and for example, any organic metal complex that can exist in the metal ink as a type of organic metal and can form metal particles by dissolving organic materials during a firing procedure, may be used to achieve the objects of the present invention.

In particular, it is preferable to use a metal ink containing an organic metal complex with a special structure, which is disclosed in Korean Patent Application No. 2005-34371 filled by the present inventors, since the use of such the metal ink can produce a metal film having uniform thickness, excellent conductivity, and low firing temperature and does not leave residues except for conductive materials after firing.

The above metal ink containing the organic metal complex is prepared by forming a metal [ammonium carbamate-based compound, ammonium carbonate-based compound, or ammonium bicarbonate-based compound] complex through reaction of a metal compound and at least one selected from an ammonium carbamate-based compound, an ammonium carbonate-based compound, and an ammonium bicarbonate-based compound, and preparing the metal ink containing the organic metal complex. The same preparing method is also applied to the present invention.

The metal ink containing the organic metal complex includes an organic metal complex obtained by reacting at least one metal or metal compound expressed by chemical formula 1 below and at least one ammonium compound expressed by chemical formula 2, 3, or 4 below.

$$M_nX \quad \text{[Chemical formula 1]}$$

(where M is a metal or a metal alloy; n is an integer from 1 to 10; and X is absent or at least one substituent selected from hydrogen, ammonium, oxygen, sulfur, halogen, cyano, cyanate, carbonate, nitrate, nitrite, sulfate, phosphate, thiocyanate, chlorate, perchlorate, tetrafluoroborate, acetylacetonate, mercapto, amide, alkoxide, carboxylate, and a derivative thereof.)

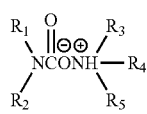
[Chemical formula 2]

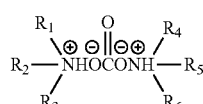
[Chemical formula 3]

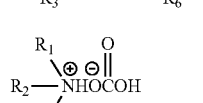
[Chemical formula 4]

(wherein, R1, R2, R3, R4, R5 and R6 each are independently selected from hydrogen, substituted or unsubstituted C1-C30 aliphatic or cycloaliphatic alkyl, aryl or aralkyl group, a high molecular compound group, a heterocyclic compound group, and a derivative thereof; and R1 and R2 or R4 and R5 are connected to each other to form a ring.)

As a specific example, in cases where n is 1 and X is absent, the compound of chemical formula 1 may represent a metal, such as, Au, Cu, Zn, Ni, Co, Pd, Pt, Ti, V, Mn, Fe, Cr, Zr, Nb, Mo, W, Ru, Cd, Ta, Re, Os, Ir, Al, Ga, Ge, In, Sn, Sb, Pb, Bi, Sm, Eu, Ac, Th, or the like, or a metal alloy thereof, and in other cases, the compound of chemical formula 1 may represent a metal compound, for example, copper oxide, zinc oxide, vanadium oxide, nickel sulfide, palladium chloride, copper carbonate, iron chloride, gold chloride, nickel chloride, cobalt chloride, bismuth nitrate, vanadium acetylacetonate, cobalt acetate, tin lactate, manganese oxalate, gold acetate, palladium oxalate, copper 2-ethyl hexanoate, iron stearate, nickel formate, ammonium molybdate, zinc citrate, bismuth acetate, copper cyanide, cobalt carbonate, platinum chloride, hydrogen tetrachloroaurate, tetrabutoxy titanium, dimethoxyzirconium dichloride, aluminum isopropoxide, tin tetrafluroborate, tantalum methoxide, dedecy mercapto gold, acetylaetatee indium, or a derivative thereof. However, the compound of chemical formula 1 is not particularly limited thereto.

In chemical formula 2, 3, or 4, specific examples of each of R1 to R6 may include hydrogen, methyl, ethyl, propyl, isopropyl, butyl, isobutyl, amyl, hexyl, ethylhexyl, heptyl, octyl, isooctyl, nonyl, decyl, dodecyl, hexadecyl, octadecyl, docodecyl, cyclopropyl, cyclopentyl, cyclohexyl, allyl, hydroxy, methoxy, hydroxyethyl, methoxyethyl, 2-hydroxypropyl, methoxypropyl, cyanoethyl, ethoxy, butoxy, hexyloxy, methoxyethoxyethyl, methoxyethoxyethoxyethyl, hexamethyleneimine, morpholine, piperidine, piperazine, ethylenediamine, propylenediamine, hexamethylenediamine, triethylenediamine, pyrrole, imidazole, pyridine, carboxymethyl, trimethoxysilylpropyl, triethoxysilylpropyl, phenyl, methoxyphenyl, cyanophenyl, phenoxy, tolyl, benzyl, and a derivative thereof, and a high molecular compound such as polyallylamine or polyethyleneimine a derivative thereof, but are not limited thereto.

More specifically, examples of the ammonium carbamate-based compound of chemical formula 2 may include ammonium carbamate, ethyl ammonium ethyl carbamate, isopropyl ammonium isopropyl carbamate, n-butyl ammonium n-butyl carbamate, isobutyl ammonium isobutyl carbamate, t-butyl ammonium t-butyl carbamate, 2-ethylhexyl ammonium 2-ethylhexyl carbamate, octadecyl ammonium octadecyl carbamate, 2-methoxyethyl ammonium 2-methoxyethyl carbamate, 2-cyanoethyl ammonium 2-cyanoethyl carbamte, dibutyl ammonium dibutyl carbamate, dioctadecyl ammonium dioctadecyl carbamate, methyldecyl ammonium methyldecyl carbamate, hexamethyleneimine ammonium, hexamethyleneimine carbamate, morpholinium morpholine carbamate, pyridinum ethylhexyl carbamate, triethylenediaminum isopropyl carbamate, benzyl ammonium benzyl carbamate, triethoxysilylpropyl ammonium triethoxysilylpropyl carbamate, and the like. Examples of the ammonium carbonate-based compound of chemical formula 3 may include ammonium carbonate, ethyl ammonium ethyl carbonate, isopropyl ammonium, isopropyl carbonate, n-butyl ammonium n-butyl carbonate, isobutyl ammonium isobutyl carbonate, t-butyl ammonium t-butyl carbonate, 2-ethylhexyl ammonium 2-ethylhexyl carbonate, octadecyl ammonium octadecyl carbonate, 2-methoxyethyl ammonium 2-methoxyethyl carbonate, 2-cyanoethyl ammonium 2-cyanoethyl carbonate, octadecyl ammonium octadecyl carbonate, dibutyl ammonium dibutyl carbonate, dioctadecyl ammonium dioctadecyl carbonate, methyldecyl ammonium methyldecyl carbonate, hexamethyleneimine ammonium, hexamethyleneimine carbonate, morpholine ammonium morpholine carbonate, benzyl ammonium benzyl carbonate, triethoxysilylpropyl ammonium triethoxysilylpropyl carbonate, triethylene aminum isopropyl carbonate, and the like. Examples of the ammonium bicarbonate-based compound of chemical formula 4 may include ammonium bicarbonate, isopropyl ammonium bicarbonate, t-butyl ammonium bicarbonate, 2-ethylhexyl ammonium bicarbonate, 2-methoxyethyl ammonium bicarbonate, 2-cyanoethyl ammonium bicarbonate, dioctadecyl ammonium bicarbonate, pyridinum bicarbonate, triethylene aminum bicarbonate, and the like.

The organic metal complex is prepared by reacting the prepared ammonium carbamate-based, ammonium carbonate-based, or ammonium bicarbonate-based compound described as above with a metal or a metal compound. An ink composition used in the present invention may include the above organic metal complex and a metal or nonmetal compound, or may include a mixture of one or more of them as well as, as necessary, an additive, such as, a solvent, a stabilizer, a dispersant, a binder resin, a releasing agent, a reducing agent, a surfactant, a wetting agent, a thixotropic agent, or a leveling agent.

A solvent contained in the metal ink may be selected from water, alcohol, glycol, acetate, ether, ketone, and aliphatic hydrocarbon, aromatic hydrocarbon, or halogenated hydrocarbon based solvent, and more specifically, may be at least one selected from water, methanol, ethanol, isopropanol, 1-methoxypropanol, butanol, ethylhexyl alcohol, terpineol, ethylene glycol, glycerin, ethyl acetate, butyl acetate, methoxypropyl acetate, carbitol acetate, ethylcarbitol acetate, methyl cellosolve, butyl cellosolve, diethyl ether, tetrahydrofuran, dioxane, methylethyl ketone, acetone, dimethylformamide, 1-methyl-2-pyrrolidone, dimethyl sulfoxide, hexane, heptane, dodecane, paraffin oil, mineral spirits, benzene, toluene, xylene, chloroform, methylene chloride, carbon tetrachloride, and acetonitrile.

As a substrate used in the present invention, any substrate that can appropriately meet the characteristics of the present invention may be used. Examples of the substrate may include plastics such as polyimide (PI), polyethylene terephthalate (PET), polyethylene naphthalate (PEN), polyether sulfone (PES), Nylon, polytetra flouroethylene (PTFE), polyether ether ketone (PEEK), polyvinyl alcohol (PVA), polyethylene (PE), polypropylene (PP), polycarbonate (PC), polyalylate (PAR), and the like, resins such as various kinds of acrylics, urethane, fluorine, silicon epoxy, vinyl resin, and the like, rubber materials such as butyl rubber, chloroprene rubber, SBR, EPR, SIS rubber, and the like, various kinds of ceramic materials such as glass, silica, alumina, titanium oxide, zirconia, ceria, clay, stone, talc, mica and the like, various kinds of metals or metal alloy such as aluminum, copper, nickel, iron, zinc, stainless, brass, and the like, nonmetal or metal salt compounds such as carbon, graphite, carbon nanotube, silicon, sulfur, salt, barium sulfate, and the like, various kinds of paper such as synthetic paper, photographic paper, wrapping paper, corrugated paper, and the like, and various kinds of composite composed of these materials, but are particularly not limited thereto. In addition, examples of shapes or forms of the substrate may include a powder, a flake, a bead, a ball, a fiber, a film, a foil, a sheet, a chip, a rod, a wire, a needle, a whisker, and the like, but are particularly limited thereto.

A method of coating or printing the metal ink containing the organic metal complex, depending on physical properties of the ink and types of substrate, may include, for example, spin coating, roll coating, spray coating, dip coating, flow coating, comma coating, kiss coating, die coating, doctor blade, dispensing, inkjet, offset, screen, pad, gravure, flexography, stencil, imprinting, xerography, lithography, fluidized bed coating, atomic layer deposition (ALD), chemical vapor deposition (CVD), physical vapor deposition (PVD), ion plasma coating, electrostatic coating, electro-deposition coating, and the like. Any method that can be suitable for the present invention may be used without particular limitation.

Meanwhile, in cases of coating or printing using the above method, the thickness of coating or printing is preferably, but not limited to, 1 nanometer to 100 microns, more preferably 10 to 50 microns. The printing thickness may be controllable by regulating the concentration, printing amount, or printing rate of the metal ink The parallel-performing of a pressure process during a procedure of forming metal particles by firing the metal ink to form a conductive metal film, means a step of coating or printing the metal ink on the substrate and then parallel-performing a pressure process, at the time when metal particles are formed, during a firing process, thereby forming a metal film.

As the firing method, oxidative or reductive treatment or thermal treatment, hot air, microwaves, infrared rays, ultraviolet rays, electronic rays, laser, or the like may be employed after the coating or printing. The conductive metal film is formed by parallel-performing a pressure process such as compressing or decompressing during the firing process.

As a specific method of applying pressure during the firing process after the coating or printing, any method that application of pressure can be allowable in a direct method or an indirect method, such as, a pressurizing method using gas such as air or nitrogen, a pressing method using a conveyer belt, a roll, or a press, a method using a vacuum chamber, a gas spraying method, or the like may be employed.

The pressure process may be performed, preferably while the firing process is in progress after coating or printing of the metal ink, and more preferably at the time when volatile liquid is mostly removed and thus a shape of the metal film does not spread or smear due to the pressure process. For example, when transparent silver complex ink is applied by spin-coating and then fired in a hot-air dry oven of 120° C. or more in the preparing method of the metal ink of the present invention, volatile solvent and materials constituting the organic metal complex which is stable at room temperature are volatilized or degraded with the rise in temperature, and finally resulting in nanoparticles. These nanoparticles lead to particles having large sizes, passing through a mutual sintering process, and finally exhibit colors by surface plasmon resonance while they become the metal film. In a case of the present invention, the colors largely exhibit brown-blue-yellow-silver color in this order. That is to say, the brown color is exhibited at the time when silver particles are formed, and color change is shown depending on the sizes of particles while the firing is in progress, and at last, the growth of silver particles is completed to exhibit the silver color.

As such, the firing process is finally performed in parallel with the pressure process at the time when the metal particles are formed, thereby obtaining a metal film having superior conductivity due to a dense metal structure and superior reflectance due to uniform surface roughness, as compared with a case where the pressure process is performed after the firing process is completed. The main reason for these effects is thought to result from a fact that the pressure process helps the mutual sintering of the metal nanoparticles, which are generated during the firing process or previously exist in the metal ink, to proceed promptly, and consequently, maximizing a synergy effect.

The temperature for the pressure process is 50 to 600° C., preferably 80 to 500° C., and more preferably 100 to 500° C., in the range where the substrate and the metal film are not damaged, considering the properties of the substrate. In addition, it is preferable to perform the pressure process in two or more stages at a low temperature and a high temperature within the above range, for uniformity of the metal film. For example, it is preferable to perform the pressure process for 5 seconds at a temperature of 80 to 150° C., or for 15 seconds at a temperature of 150 to 300° C. The pressure process may be performed by using a compressing process or a decompressing process, or as necessary, by using both of the compressing process and the decompressing process. The pressure level for the compressing process or the decompressing process may be in a range where the substrate and the metal patterns are not damaged, considering the properties of the substrate, but the compressing process has a pressure level in the range of 1 Kg/cm$^2$ to 5000 Kg/cm$^2$ while the decompressing process has a pressure level in the range of $10^2$ torr to $10^{-6}$ torr.

The thickness of the fired metal film is largely limited, but may be 0.005 to 20 microns, preferably 0.01 to 15 microns, and more preferably 0.05 to 5 microns.

The thickness, electric conductivity, reflectance, surface roughness, adhesive strength and the like of the metal film are controllable by regulating temperature, pressure, and processing time of the pressure process.

Advantageous Effects

As set forth above, the metal film obtained by finally performing the firing process in parallel with the pressure process at the time when the metal particles are formed, according to the present invention, can have superior conductivity due to a dense metal structure and superior reflectance due to uniform surface roughness, since the pressure process helps the mutual sintering of the metal nanoparticles, which are formed during the firing process or previously exist in the metal ink, to proceed promptly.

Furthermore, the method for manufacturing a conductive metal film according to the present invention can improve film characteristics such as conductivity, reflectance, and uniformity in thickness, and the like, as well as remarkably shorten the time for forming the metal film.

BEST MODE

Figure 1:
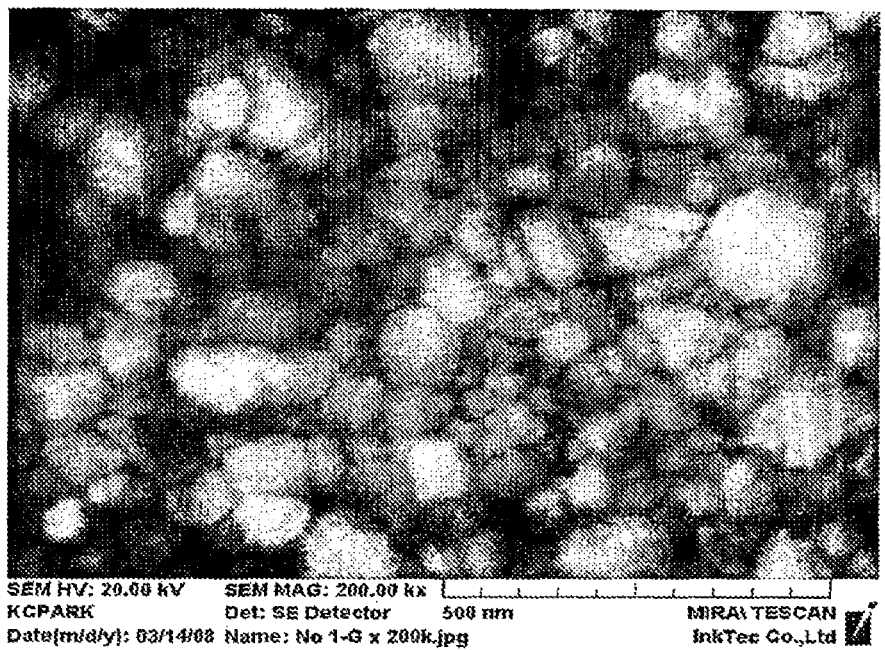
FIG. 1 is an SEM picture showing a surface of a metal film manufactured by parallel-performing a pressure process according to example 1.
Figure 2:
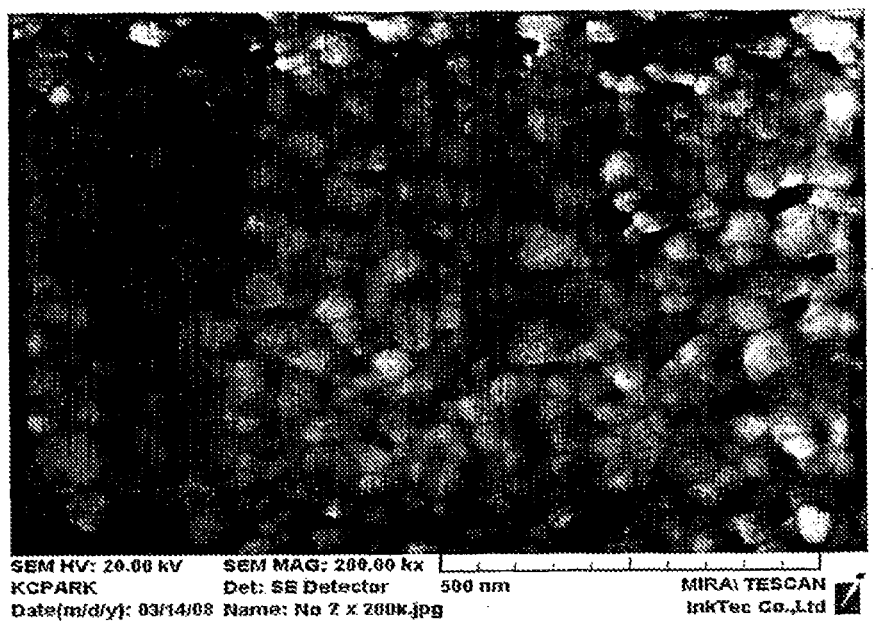
FIG. 2 is an SEM picture showing a surface of a metal film manufactured by performing only a firing process according to comparative example 1.

The present invention will be in more detail described with reference to the following examples. However, the following examples only exemplify the present invention, and thus do not limit claims of the present invention.

Preparing Example 1

Preparation of Metal Ink 1

34.89 g (129.8 millimole) of viscous liquid in which 2-ethylhexyl ammonium 2-ethylhexyl carbamate and butyl ammonium butyl carbamate were mixed at a mole ratio of 7:3 was put into a Schlenk flask of 250 ml equipped with stirrers, and 12.03 g (51.92 millimole) of silver oxide (prepared by Aldrich company) was added thereto. The resulting mixture was reacted while stirred for 2 hours at room temperature. As the reaction proceeded, the slurry having initially black color became weak to generate complex compounds, and finally, obtaining 46.92 g of a transparent liquid type yellow silver complex, which had a silver content of 23.65 wt % as a result of thermogravimetric analysis (TGA). This silver complex solution was diluted with IPA, to prepare metal ink solution 1 having a silver content of 10 wt % and a viscosity of 14 cps.

Preparing Example 2

Preparation of Metal Ink 2

58.93 g of the metal ink prepared from preparing example 1 and 41.07 g of silver nanoparticles (prepared by Ferro company) were put into a Schlenk flask of 250 ml equipped with stirrers, followed by first stirring for 30 minutes at room temperature. The stirred liquid was secondly stirred through a three-bar roll mill, thereby preparing metal ink 2 having a silver content of 55 wt % and a viscosity of 6000 cps (Brook Field DVII pro, 15 spindle, 50 rpm).

Preparing Example 3

Preparation of Metal Ink 3

1.00 g (7.71 millimole) of nickel chloride (II)-6 hydrate was dissolved in 5.00 ml of aqueous solution in a Schlenk flask of 250 ml equipped with stirrers, and a solution, where 5.83 g (19.27 millimole) of 2-ethylhexyl ammonium 2-ethylhexyl carbamate, which is viscous liquid, was dissolved in 10.00 ml of benzene, was added to the aqueous nickel chloride (II) solution. The resulting mixture was reacted while intensely stirred for 2 hours at room temperature, As the reaction proceeded, the reaction mixture turned into a white slurry from an initial green slurry. After finishing the reaction, transparent colorless aqueous solution phase and transparent green organic solvent phase were separated from each other. Only the organic solvent phase was extracted, followed by removal of all the solvent under vacuum, thereby obtaining 4.73 g of a dark green nickel complex compound, which had a nickel content of 14.54 wt % as a result of thermogravimetric analysis (TGA). This complex solution was diluted with IPA, to prepare metal ink solution 3 having a nickel content of 10 wt % and a viscosity of 17 cps.

Preparing Example 4

Preparing Metal Ink 4

1.00 g (5.64 millimole) of palladium chloride was dissolved in 5.00 ml of aqueous solution in a Schlenk flask of 250 ml equipped with stirrers, and a solution, where 1.71 g (16.92 millimole) of 2-ethylhexyl ammonium 2-ethylhexyl carbamate, which is viscous liquid, was dissolved in 5.00 ml of ethylacetate, was added to the aqueous palladium chloride (II) solution. The resulting mixture was reacted while intensely stirred for 2 hours at room temperature, As the reaction proceeded, the reaction mixture turned into a colorless slurry from an initial red slurry. After finishing the reaction, transparent colorless aqueous solution phase and transparent colorless organic solvent phase were separated from each other. Only the organic solvent phase was extracted, followed by removal of all the solvent under vacuum, thereby obtaining 2.22 g of a transparent yellow palladium complex compound, which had a palladium content of 10.08 wt % as a result of thermogravimetric analysis (TGA). This complex solution was diluted with methanol, to prepare metal ink solution 4 having a palladium content of 8.5 wt % and a viscosity of 25 cps.

Example 1

In order to manufacture a conductive metal film, a PET film for a metal foil of 5 cm by 5 cm was prepared. Then, dust was removed from a surface of the PET film by using ethanol, and the PET film was dried at 50° C. for 5 minutes in a drier. The PET film was subjected to application of 5 ml of metal ink 1 prepared from the preparing example 1 thereonto and rotation by a spin coater at 500 rpm for 20 seconds, and thus, the PET film was surface-coated. The resulting PET film was subjected to a heat treatment process at 130° C. for 7 seconds, during which a compressing process is parallelly-performed at 140° C. for 45 seconds by using a heat compressor of 20 Kg/cm$^2$ at the time when the metal film exhibited blue color, thereby finally manufacturing a firing-completed silver metal film. Results of sheet resistance and reflectance of the manufactured metal film were shown in Table 1.

Comparative Example 1

In order to manufacture a conductive metal film, a PET film of 5 cm by 5 cm was prepared. Then, dust was removed from a surface of the PET film by using ethanol, and the PET film was dried at 50° C. for 5 minutes in a drier. The PET film was subjected to application of 5 ml of metal ink 1 prepared from the preparing example 1 thereonto and rotation by a spin coater at 500 rpm for 20 seconds, and thus, the PET film was surface-coated. The resulting PET film was subjected to firing at 150° C. for 3 minutes, thereby manufacturing a silver metal film. Then, the silver metal film was heat-compressed by using a heat compressor of a pressure of 20 Kg/cm² at 140° C. for 45 seconds, thereby manufacturing a metal film. A surface of the manufactured metal film was confirmed by SEM, and results of sheet resistance and reflectance thereof were shown in FIG. 1.

TABLE 1

| | Color[1] | Sheet resistance[2] ($\Omega/\square$) | Reflectance[3] (%) |
|---|---|---|---|
| Example 1 | Blue | 0.31 | 99.47 |
| Comparative example 1 | Silver | 0.40 | 96.01 |

[1]Color of metal film at the time of starting pressure process
[2]Conductivity after forming of metal film (Measuring equipment: CMT-SR/1000N/4 probe type)
[3]Reflectance after forming of metal film (Measuring equipment: Cary5000 UV-Vis-NIR Spectrometer)

As seen in FIG. 1 and table 1, the pressure process during the firing process helps the mutual sintering of the metal nanoparticles, which are generated during the firing process or previously exist in the metal ink, to proceed promptly, and consequently, thereby manufacturing a superior-quality metal film of which sheet resistance is decreased by 0.1 due to a dense metal structure and reflectance is improved by 3.4% due to uniform surface roughness.

Example 2

In order to manufacture a conductive metal film, a glass plate was prepared. Then, dust was removed from the glass plate by using ethanol, and the glass plate was dried at 50° C. for 5 minutes in a drier. The glass plate was printed with metal ink 2 prepared from the preparing example 2 by using 400-mesh screen printing. The glass substrate was subjected to a heat treatment process at 130° C. for 10 seconds, during which the glass plate was heat-compressed at 150° C. for 30 seconds by using a heat compressor at a pressure of 70 Kg/cm² at the time when the metal film exhibited yellow color, thereby finally manufacturing a fired metal film. A surface of the manufactured metal film was confirmed by SEM, and results of sheet resistance and reflectance thereof are shown in Table 2.

Comparative Example 2

In order to manufacture a conductive metal film, a glass plate was prepared. Then, dust was removed from the glass plate by using ethanol, and the glass plate was dried at 50° C. for 5 minutes in a drier. The glass plate was printed with metal ink 2 prepared from the preparing example 2 by using 400-mesh screen printing. The glass plate was subjected to firing at 150° C. for 3 minutes, to manufacture a silver metal film. Then, the silver metal film was heat-compressed by using a heat compressor at a pressure of 70 Kg/cm² at 150° C. for 30 seconds, thereby manufacturing a metal film. Results of sheet resistance and reflectance of the manufactured metal film are shown in Table 2.

TABLE 2

| | Color[1] | Conductivity[2] ($\Omega/\square$) | Reflectance[3] (%) |
|---|---|---|---|
| Example 2 | Yellow | 0.12 | 90.94 |
| Comparative example 2 | Silver | 0.29 | 60.23 |

[1]Color of metal film at the time of starting pressure process
[2]Conductivity after forming of metal film (Measuring equipment: CMT-SR/1000N/4 probe type)
[3]Reflectance after forming of metal film (Measuring equipment: Cary5000 UV-Vis-NIR Spectrometer)

As seen in table 2, the pressure process during the firing process helps the mutual sintering of the metal nanoparticles, which are generated during the firing process or previously exist in the metal ink, to proceed promptly, and consequently, thereby manufacturing a superior-quality metal film of which sheet resistance is decreased by 0.17 due to a dense metal structure and reflectance is improved by 30% due to uniform surface roughness.

Example 3

Conductivity and Reflectance of Metal Film Manufactured by Using a Conveyor Belt Compressor Physical properties, sheet resistance and reflectance of a conductive metal film according to a pressure process (conveyor belt compressor) were measured. In order to manufacture a conductive metal film, a PET film of 300 mm width and 200 mm length was prepared, and then, printed with metal ink 1 prepared from the preparing example 1 at a rate of 20 m/s by using a microgravure coater. The PET film was subjected to a heat treatment process at 130° C. for 7 seconds, during which a heat compressing process is performed at 150° C. for 30 seconds by using a conveyor belt compressor at a pressure of 40 Kg/cm² at the time when the metal film exhibited blue color, thereby finally manufacturing a firing-completed silver metal film. Results of sheet resistance and reflectance of the manufactured metal film are shown in Table 3.

Example 4

Conductivity and Reflectance of Metal Film Manufactured by Using a Vacuum Oven Physical properties, sheet resistance and reflectance of a conductive metal film according to a pressure process (a vacuum oven) were measured. In order to manufacture a conductive metal film, a PET film of 5 cm by 5 cm was prepared in order to manufacture a metal foil. Then dust was removed from a surface of the PET film by using ethanol, and the PET film was dried at 50° C. for 5 minutes in a drier. The PET film was subjected to application of 5 ml of metal ink 1 prepared from the preparing example 1 thereonto and rotation by a spin coater at 500 rpm for 20 seconds, and thus, the PET film was surface-coated. The resulting PET film was subjected to a heat treatment process at 130° C. for 7 seconds, during which a compressing process is parallelly-performed at 150° C. for 50 seconds by using a vacuum oven of $10^{-3}$ Torr at the time when the metal film exhibited blue color, thereby finally manufacturing a firing-completed silver metal film.

Results of sheet resistance and reflectance of the manufactured metal film are shown in Table 3.

Example 5

Conductivity and Reflectance of Metal Film Manufactured by Using a Nitrogen Filled Chamber Physical properties, sheet resistance and reflectance of a conductive metal film according to a pressure process (nitrogen-filled chamber) were measured. In order to manufacture a conductive metal film, a PET film of 5 cm by 5 cm was prepared in order to manufacture a metal foil. Then dust was removed from a surface of the PET film by using ethanol, and the PET film was dried at 50° C. for 5 minutes in a drier. The PET film was subjected to application of 5 ml of metal ink 1 prepared from the preparing example 1 thereonto and rotation by a spin coater at 500 rpm for 20 seconds, and thus, the PET film was surface-coated. The resulting PET film was subjected to a heat treatment process at 130° C. for 6 seconds, during which a compressing process is parallelly-performed at 150° C. for 40 seconds by using a nitrogen-filled chamber of a pressure of 50 Kg/cm$^2$ at the time when the metal film exhibited blue color, thereby finally manufacturing a firing completed silver metal film. Results of sheet resistance and reflectance of the manufactured metal film are shown in Table 3.

TABLE 3

|  | Color[1] | Sheet resistance[2] ($\Omega/\square$) | Reflectance[3] (%) |
| --- | --- | --- | --- |
| Example 3 | Blue | 0.25 | 99.50 |
| Example 4 | Blue | 0.35 | 98.20 |
| Example 5 | Blue | 0.30 | 98.70 |

[1]Color of metal film at the time of starting pressure process
[2]Conductivity after forming of metal film (Measuring equipment: CMT-SR/1000N/4 probe type)
[3]Reflectance after forming of metal film (Measuring equipment: Cary5000 UV-Vis-NIR Spectrometer)

As confirmed in table 3, as the result of selecting appropriate pressure processes, considering characteristics of the substrates, the pressure processes by compressing or decompressing in examples 3 to 6 led to metal films each having sheet resistance of 0.3 or less due to a dense metal structure, and also, regardless of a difference in pressure process depending on the characteristics of the substrates, reflectance of 98% or more.

Example 6

Sheet resistance and reflectance of a metal film according to the kind of metal ink containing organic metal complex compound with respect to a pressure process were measured. In order to manufacture a conductive metal film, a PET film of 5 cm by 5 cm was prepared. Then, dust was removed from a surface of the PET film by using ethanol, and the PET film was dried at 50° C. for 5 minutes in a drier. The PET film was subjected to application of 5 ml of metal ink 3 prepared from the preparing example 3 thereonto and rotation by a spin coater at 500 rpm for 20 seconds, and thus, the PET film was surface-coated. The resulting PET film was subjected to a heat treatment process at 130° C. for 12 seconds, during which a heat compressing process is performed at 150° C. for 30 seconds by using a heat compressor at a pressure of 70 Kg/cm$^2$ at the time when the metal film exhibited gray color, thereby finally manufacturing a firing-completed gray metal film. Results of sheet resistance and reflectance of the manufactured metal film are shown in Table 4.

Example 7

Sheet resistance and reflectance of a metal film according to the kind of metal ink containing organic metal complex with respect to a pressure process were measured. In order to manufacture a conductive metal film, a PET film of 5 cm by 5 cm was prepared. Then, dust was removed from a surface of the PET film by using ethanol, and the PET film was dried at 50° C. for 5 minutes in a drier. The PET film was subjected to application of 5 ml of metal ink 4 prepared from the preparing example 4 thereonto and rotation by a spin coater at 500 rpm for 20 seconds, and thus, the PET film was surface-coated. The resulting PET film was subjected to a heat treatment process at 130° C. for 10 seconds, during which a heat compressing process is performed at 150° C. for 30 seconds by using a heat compressor at a pressure of 70 Kg/cm$^2$ at the time when the metal film exhibited dark gray color, thereby finally manufacturing a firing-completed dark gray metal film. Results of sheet resistance and reflectance of the manufactured metal film are shown in Table 4.

TABLE 4

|  | Color[1] | Sheet resistance[2] ($\Omega/\square$) | Reflectance[3] (%) |
| --- | --- | --- | --- |
| Example 6 | Gray | 1.5 | 75.25 |
| Example 7 | Dark gray | 1.9 | 73.39 |

[1]Color of metal film at the time of starting pressure process
[2]Conductivity after forming of metal film (Measuring equipment: CMT-SR/1000N/4 probe type)
[3]Reflectance after forming of metal film (Measuring equipment: Cary5000 UV-Vis-NIR Spectrometer)

As confirmed in table 4, even in a case of using the organic metal complex obtained by reacting a metal compound such as palladium chloride and nickel chloride and an ammonium carbamate-based compound such as ethyl ammonium ethyl carbamate, conductivity and reflectance of the metal film manufactured by parallel-performing the pressure process were excellent.

The invention claimed is:

1. A method for manufacturing a conductive metal film, comprising:
    a) coating or printing a metal ink comprising an organic metal complex on a substrate;
    b) firing the coated or printed metal ink of step a) to form metal particles by reduction of the organic metal complex in the metal ink; and
    c) additionally applying at least one of compression and decompression only after the size of the metal particles formed at the firing step of b) increase due to sintering and the metal ink exhibits a color by surface plasmon resonance that is not a final color of the metal film, thereby forming a conductive metal film comprising metal particles.

2. The method of claim 1, wherein the at least one of compression and decompression is applied by at least one selected from a pressurizing method using gas, a pressing method using a conveyer belt, a roll, or a press, and a type using a vacuum chamber.

3. The method of claim 1, wherein compression is performed under a pressure of 20 Kg/cm$^2$ to 5000 Kg/cm$^2$.

4. The method of claim 1, wherein decompression is performed under a pressure of $10^2$ torr to $10^{-6}$ torr.

5. The method of claim 1, wherein the organic metal complex is obtained by reacting at least one metal or metal compound expressed by chemical formula 1 below and at least one ammonium compound expressed by chemical formula 2, 3, or 4 below $$M_nX$$ [Chemical formula 1]

(wherein, M is a metal or a metal alloy; n is an integer from 1 to 10; and X is absent or at least one substituent selected from hydrogen, ammonium, oxygen, sulfur, halogen, cyano, cyanate, carbonate, nitrate, nitrite, sulfate, phosphate, thiocyanate, chlorate, perchlorate, tetrafluoroborate, acetylacetonate, mercapto, amide, alkoxide, carboxylate, and a derivative thereof)

[Chemical formula 2]
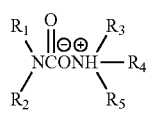

[Chemical formula 3]
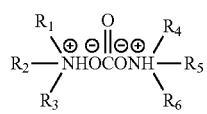

[Chemical formula 4]
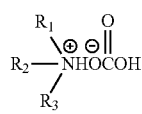

(wherein, R1, R2, R3, R4, R5 and R6 each are independently selected from hydrogen, substituted or unsubstituted C1-C30 aliphatic or cycloaliphatic alkyl, aryl or aralkyl group, a high molecular compound group, a heterocyclic compound group, and a derivative thereof; and R1 and R2 or R4 and R5 are connected to each other to form a ring).

6. The method of claim 5, wherein the metal or metal compound includes at least one component selected from a group consisting of Au, Cu, Zn, Ni, Co, Pd, Pt, Ti, V, Mn, Fe, Cr, Zr, Nb, Mo, W, Ru, Cd, Ta, Re, Os, Ir, Al, Ga, Ge, In, Sn, Sb, Pb, Bi, Sm, Eu, Ac, Th, copper oxide, zinc oxide, vanadium oxide, nickel sulfide, palladium chloride, copper carbonate, iron chloride, gold chloride, nickel chloride, cobalt chloride, bismuth nitrate, vanadium acetylacetonate, cobalt acetate, tin lactate, manganese oxalate, gold acetate, palladium oxalate, copper 2-ethyl hexanoate, iron stearate, nickel formate, ammonium molybdate, zinc citrate, bismuth acetate, copper cyanide, cobalt carbonate, platinum chloride, cobalt carbonate, platinum chloride, hydrogen tetrachloroaurate, tetrabutoxy titanium, dimethoxyzirconium dichloride, aluminum isopropoxide, tin tetrafluroborate, tantalum methoxide, dodecyl mercapto gold, and acetylaetatee indium.

7. The method of claim 5, wherein R1 to R6 of the ammonium compound includes at least one selected from a group consisting of hydrogen, methyl, ethyl, propyl, isopropyl, butyl, isobutyl, amyl, hexyl, ethylhexyl, heptyl, octyl, isooctyl, nonyl, decyl, dodecyl, hexadecyl, octadecyl, docodecyl, cyclopropyl, cyclopentyl, cyclohexyl, allyl, hydroxy, methoxy, hydroxyethyl, methoxyethyl, 2-hydroxy propyl, methoxypropyl, cyanoethyl, ethoxy, butoxy, hexyloxy, methoxyethoxyethyl, methoxyethoxyethoxyethyl, hexamethyleneimine, morpholine, piperidine, piperazine, ethylenediamine, propylenediamine, hexamethylenediamine, triethylenediamine, pyrrole, imidazole, pyridine, carboxymethyl, trimethoxysilylpropyl, triethoxysilylpropyl, phenyl, methoxyphenyl, cyanophenyl, phenoxy, tolyl, benzyl, and a derivative thereof, and a high molecular compound such as polyallylamine or polyethyleneimine and a derivative thereof.

* * * * *